US010065408B2

(12) United States Patent
Petruzzelli et al.

(10) Patent No.: US 10,065,408 B2
(45) Date of Patent: Sep. 4, 2018

(54) SCREEN PRINTING METHOD

(71) Applicants: Michele Petruzzelli, Zagarolo (IT); Annalisa D'Elia, Zagarolo (IT)

(72) Inventors: Michele Petruzzelli, Zagarolo (IT); Annalisa D'Elia, Zagarolo (IT)

( * ) Notice: Subject to any disclaimer, the term of this patent is extended or adjusted under 35 U.S.C. 154(b) by 0 days.

(21) Appl. No.: 15/035,718

(22) PCT Filed: Nov. 11, 2014

(86) PCT No.: PCT/IT2014/000299
§ 371 (c)(1),
(2) Date: May 10, 2016

(87) PCT Pub. No.: WO2015/071919
PCT Pub. Date: May 21, 2015

(65) Prior Publication Data

US 2016/0288482 A1 Oct. 6, 2016

(30) Foreign Application Priority Data

Nov. 13, 2013 (IT) ............................ RM2013A0624

(51) Int. Cl.
*H01G 4/12* (2006.01)
*H01G 4/30* (2006.01)
(Continued)

(52) U.S. Cl.
CPC .......... *B41F 15/0818* (2013.01); *B41F 15/22* (2013.01); *B41F 15/36* (2013.01);
(Continued)

(58) Field of Classification Search
CPC .......... B41F 15/22; B41F 15/36; B41F 15/42; B41F 15/0818; B41M 1/12; B41M 5/025; B41M 5/03; B41M 5/035; B44C 1/16
(Continued)

(56) References Cited

U.S. PATENT DOCUMENTS 3,294,612 A * 12/1966 Sullivan ................. B41M 5/025
101/142
4,098,184 A * 7/1978 Okada ................... B41F 17/006
101/115

(Continued)

FOREIGN PATENT DOCUMENTS

JP H05-6836 A 1/1993
WO WO 2005/105467 A1 11/2005

OTHER PUBLICATIONS

International Search Report and Written Opinion issued in Italian Patent Application No. RM20130624 dated Jul. 3, 2014.

(Continued)

*Primary Examiner* — Leslie J Evanisko
*Assistant Examiner* — Marissa Ferguson Samreth
(74) *Attorney, Agent, or Firm* — Themis Law

(57) ABSTRACT

A screen printing method for creating an image on a target support by providing a screen printing machine comprising a supporting structure a matrix mounted on the supporting structure, in which an image is defined, and a supporting surface, the matrix being faced to the supporting surface when the supporting structure is arranged in a lower position; placing the supporting structure in the lower position; applying ink on at least a portion of the matrix to enable the ink to move from the matrix to the supporting surface, such as to reproduce the image on at least a portion of the supporting surface; placing the supporting structure in an upper position; providing a transferring support to transfer the ink from the supporting surface to the target support, applying an adhesive portion of the transferring support to a region of the supporting surface on which the ink is placed; removing the transferring support from the supporting surface; and applying the adhesive portion to the target support, to allow the ink reproducing the image to move from the transferring support to the target support.

9 Claims, 4 Drawing Sheets

(51) Int. Cl.

| | |
|---|---|
| ***B41M 1/12*** | (2006.01) |
| ***B41M 1/34*** | (2006.01) |
| ***B41F 15/08*** | (2006.01) |
| ***B41M 5/025*** | (2006.01) |
| ***B41M 5/03*** | (2006.01) |
| ***B41F 15/22*** | (2006.01) |
| ***B41F 15/36*** | (2006.01) |
| ***B41F 15/42*** | (2006.01) |

(52) U.S. Cl.
CPC ............... *B41F 15/42* (2013.01); *B41M 1/12* (2013.01); *B41M 5/025* (2013.01); *B41M 5/03* (2013.01)

(58) Field of Classification Search
USPC .................................... 101/41, 153, 492, 493
See application file for complete search history.

(56) References Cited

U.S. PATENT DOCUMENTS

| | | | | | |
|---|---|---|---|---|---|
| 5,054,390 | A * | 10/1991 | Birtles | B41F 17/001 | 101/114 |
| 5,343,802 | A * | 9/1994 | Shimada | B41F 15/0813 | 101/123 |
| 7,267,055 | B2 * | 9/2007 | Weiss | C09D 11/037 | 101/170 |
| 7,268,705 | B2 * | 9/2007 | Kong | H03K 17/969 | 341/31 |
| 8,893,617 | B2 * | 11/2014 | Muraoka | B41F 17/001 | 101/35 |
| 2006/0196372 | A1 * | 9/2006 | Kennedy, III | A63B 45/02 | 101/35 |
| 2008/0053603 | A1 * | 3/2008 | Epling | B41M 5/0256 | 156/235 |
| 2008/0105145 | A1 * | 5/2008 | Schaafsma | B41F 17/001 | 101/41 |
| 2010/0186611 | A1 * | 7/2010 | Miyahara | B41F 15/423 | 101/127 |
| 2011/0076470 | A1 * | 3/2011 | Zaveri | B32B 5/18 | 428/196 |
| 2012/0318154 | A1 * | 12/2012 | Muraoka | B41N 10/02 | 101/401.1 |

OTHER PUBLICATIONS

International Search Report and Written Opinion issued in PCT/IT2014/000299 dated Mar. 9, 2015.

* cited by examiner

SCREEN PRINTING METHOD

FIELD OF THE INVENTION

The present invention concerns an improved screen printing method, in particular a method of screen printing for transferring a picture or a graphic on any target support.

BACKGROUND OF THE INVENTION

In the following, the description will be directed to the application of the screen printing method according to the present invention to a window shutter; however, said method should not be considered in any way limited to this specific use, being it applied to any other support other than a window shutter.

Several screen printing methods are known.

Normally, traditional screen printing methods involve the use of a fabric arranged stretched on a frame hinged to a lower base, on which the piece, or the support, to be decorated is placed.

Before proceeding to screen printing, the above fabric is cut so as to create in it areas permeable and other areas impermeable to the ink, thereby forming a so-called matrix image.

Once the fabric is rested on a surface of the piece to be decorated and poured ink on the side of the fabric opposite to the workpiece, it is obtained the image formation on said surface, due to the passage of the ink through the permeable areas of the fabric.

Currently there are several ways to prepare a screen printing image matrix.

The easiest method to prepare a image matrix is to draw it by hand on paper or on a film in the desired form and size, cutting it and sticking it on the frame, or drawing the image negative directly on the frame and applying a filler material that becomes waterproof, when it is dry, on the parts outside of the drawing.

Another technique, however more complex, to prepare an image matrix is to draw the image on a fabric print with a special fluid, letting it dry and completely cover the aforementioned fabric with a waterproof material. After fluid drying, water is sprayed on the fabric, in such a way that the areas previously covered with the fluid to be cleaned and, therefore, made free for the following passage of the ink, leaving the other areas covered.

The image matrix can be alternatively realized by direct engraving systems. These systems, commonly referred by the acronym CTS (Computer To Screen) in the field jargon, have the advantage of being repeatable digital processes, which do not require the use of films.

For multi-color screen prints the use of more matrices (one for each color) is provided, for which, during printing, it is necessary to keep a perfect print register.

Normally, the screen printing frame is made of a fabric of very fine and regular yarn, arranged stretched on an aluminum, iron or sometimes wood frame.

In the past, the traditionally used fabric in screen printing was the silk; today, however, in its place nylon or polyester are used.

As described above, in screen printing certain areas of the printing fabric are "blocked", or made waterproof to the ink, for composing a predetermined image. In this way, the "blocked" fabric parts do not appear in the print on the target support. Differently in the free, or permeable, parts of the fabric, the ink passes through the tiny holes of the cavities formed by the weft and warp threads, to deposit on the surface of the support to be decorated.

The so treated fabric takes, generally, the name of image array.

The screen printing techniques normally used in industrial processes provide the use of photosensitive dichromate or diazo gelatin, as substances for the formation of the waterproof areas in the image matrices.

Once the image is drawn or transferred on the printing fabric by one of the traditional techniques, it is placed on the support to be decorated. At this point, the ink is poured over the fabric, precisely on the side of the fabric opposite to the support to be decorated, and with a rubber spatula, even called "squeegee", it is spread over the entire surface of the same, including the open areas to the substrate.

In this way, the ink passes through the open spaces and is deposited on the underlying substrate, such as paper, canvas, cloth.

After the ink transfer from the printing fabric to the selected support, the latter is dried, while the frame may be subjected to cleaning for a possible later reuse.

Another image transfer method consists in applying, by means of a support of special transfer paper having the same function of the above described printing fabric, a printed pattern by screen printing on a target surface. More specifically, the latter method provides that the image transfer is carried out at high temperature (i.e. at a temperature between 120.degree. C. and 180.degree. C.) and in a pressurized environment, for a period varying between 10 seconds and 15 seconds. This screen printing method is normally performed by means of a large size printing machine, with a treatment chamber, in which reproducing the pressure and temperature conditions required for the image thermal transfer is possible.

The combined action of pressure and temperature makes possible the drying of the inks used for printing and their fixing on the target surface.

To bring up the pattern on the target surface it is finally necessary removing the support of transfer paper from the chosen support.

The main types of heat transfer are known under the names of "SPLIT HOT" and "COLD PEEL" and differ from each other mainly by the application method.

The "HOT SPLIT" method provides that the transfer paper detaches immediately after the opening of the treatment chamber of the print machine. This involves the dissolution of the ink, still hot and relatively fluid, on the target surface, and, consequently, the formation of an image by not well defined contours. In this case, most of the ink remains attached to the target surface, while the remaining part remains adherent to the transfer paper.

A variant of the "HOT SPLIT" method briefly described above involves the use of a transfer paper, commonly known with the term "PUFF". In this latter case, it is used an ink having the peculiar characteristic to expand under the effect of heat. The reasons, i.e. the resulting images, show reliefs, which makes this method particularly suitable for printing caps and T-shirts.

The "COLD PEEL" method provides, however, that both the application of the transfer paper on the target support, and the removal of the same from said support, are cold carried out. The ink transfer from the transfer paper to the substrate takes place, instead, hot.

In this case, unlike the "HOT SPLIT" method, the ink film is completely transferred from the transfer paper to the target support.

The papers used in the transfer "COLD PEEL" method are characterized by a plastic and bright appearance, and a marked opacity.

In general, it is possible to divide screen printing into four main categories (i.e. the textile screen printing, screen printing graphics, industrial screen printing and silk screen art), defined according to the types of product applications subjected to screen printing.

The textile screen printing comprises all the possible applications of the textile supports screen printing.

The graphic silk screen printing includes advertising, or illustrations, charts or drawings.

Industrial screen printing concerns, instead, the applications of functional decoration, and thus not only aesthetic.

Finally, the art screen printing regards the reproduction of works similar to the original.

The transfer technique, known from several years, provides that the images are printed with inks for the printing on plastic sheets.

The ink reproducing the image has the characteristic of a very low adhesion to the plastic sheet, because otherwise it could cause the transfer of the image from the plastic sheet to the target surface, by rubbing the sheet with pencil or rod.

Once the image is printed on said sheet of plastic, over the image it is applied, in succession, glue and then a silicone paper sheet with transparent protection function, to be removed at the time of the image transfer.

The above glue performs, instead, the function of allowing the adhesion of the image to the surface of the target support Traditional screen printing techniques have, however, several limitations and drawbacks.

Known screen printing techniques do not allow, in fact, to decorate non-linear, or curved or variously shaped surfaces.

In addition to that, they often require the disassembly of complex products, which consist of several pieces, before subjecting them to the operations of screen printing.

Furthermore, for the decoration by screen printing of large products or supports, it becomes necessary the use of particularly bulky and difficult to install printing machines.

Japanese patent document no. JP-H056836A describes a multilayer capacitors manufacturing method, formed by the alternation of dielectric layers, made by a dielectric material paste, and electrode layers, made by conductive paste, in which these layers are overlapped to each other.

In particular, the method described in the aforementioned Japanese document has the primary purpose of obtaining very thin dielectric layers and electrodes from the uniformly flat surface, limiting the risk of short circuits of the electrode.

This method involves printing, by screen printing technique, a layer of paste of dielectric material on a support plane, from which this paste is then transferred on the side surface of a soft roll, formed for example by silicone rubber, by rolling the roller on the paste layer.

The dielectric material paste layer around the roller, is then imprinted on a flat surface, by rolling the roller itself on the latter.

At this point, always by means of screen printing technique, a layer of conductive paste (ink) on a support plane is printed, from which this paste is then transferred on the side surface of a roller as said above, by rolling it on the layer of conductive paste deposited on the plan support.

The layer of conductive paste around the roller is then embossed on the dielectric material paste layer previously deposited on the flat surface.

By repeating the operating steps described above, it is then obtained a compound formed by layers of dielectric material paste alternating with layers of conductive paste.

The composite thus obtained is cut so as to obtain individual multilayer capacitors, which are then dried and cooked.

Therefore, for realizing such multilayer capacitors, it is carried out the formation of layers, of different materials, according to the continuous operating procedure indicated above.

These layers have, in fact, a continuous pattern with no embedded design, image or particular representation.

From the above it appears evident the reason for which is not minimally addressed, in this Japanese patent document, the problem of transferring an ink layer representing an image or a drawing from a source support to a target support in a reliable way, i.e. without that deformations in the image or in the drawing transferred occur.

SUMMARY OF THE INVENTION

In light of the above, it is, therefore, object of the present invention to provide a screen printing method, which allows to overcome the limitations and drawbacks described above with reference the prior art.

Another object of the invention is to provide a screen printing method enabling to affix images and/or graphics on supports of any shape.

A further object of the present invention is to provide a screen printing method enabling to affix images and/or graphics on supports made of any material (i.e. wood, metal, cement, etc.) or any combinations of materials.

Another object of the invention is to provide a screen printing method that allows decorating, in a simple and easy way, consistent size supports, without the use of bulky and difficult to install printing machines.

Further object of the invention is to provide a screen printing method, which allows to decorate complex products, without preliminarily disassemble them.

It is therefore specific object of the present invention a screen printing method for creating an image on a target support, said method comprising the following steps: providing a screen printing machine comprising a supporting structure, which is movable between a lower position and an upper position, a matrix mounted on said supporting structure, in which matrix, an image is defined, and a supporting surface, said matrix being faced to said supporting surface when said supporting structure is arranged in said lower position; placing said supporting structure in said lower position; applying ink on at least a portion of said matrix to enable the ink to move from said matrix to said supporting surface, such as to reproduce said image on at least a portion of said supporting surface; placing said supporting structure in said upper position; providing a transferring support to transfer the ink reproducing said image from said supporting surface to said target support, said transferring support being provided with at least an adhesive portion; applying said at least one adhesive portion of said transferring support to a region of said supporting surface on which the ink is placed; removing said transferring support from said supporting surface; and applying the adhesive portion of said transferring support, which carries the ink reproducing said image, to said target support, to allow the ink reproducing said image to move from said transferring support to said target support.

Still according to the invention, said matrix could comprise a textile.

Preferably according to the invention, said transferring support could be flexible.

Further according to the invention, said transferring support could be a paper tape.

Still according to the invention, said supporting surface could comprise a paper material.

Preferably according to the invention, said supporting surface could comprise silicone.

Further according to the invention, said method could comprise a step of degreasing said target support.

Still according to the invention, said method could comprise a step of applying a primer to said target support.

Preferably according to the invention, said method could comprise a step of painting said target support.

Further according to the invention, said method is carried out at room temperature.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION OF EMBODIMENTS OF THE INVENTION

Figure 1:
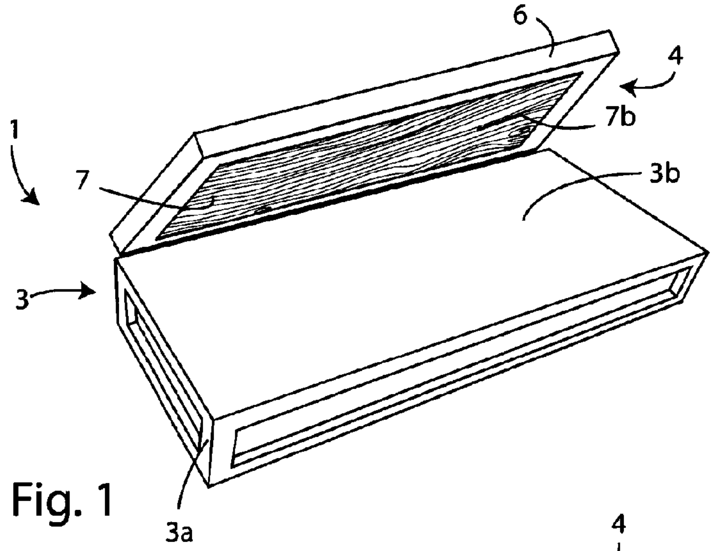
FIGS. 1 to 11 show respective steps of the screen printing method according to the present invention.
Figure 2:
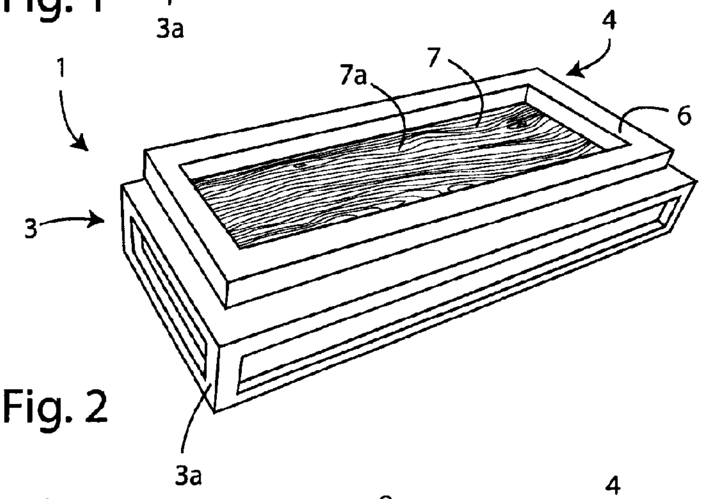

In the various figures, similar parts will be indicated by the same reference numbers.

Referring to the enclosed figures, reference number 1 indicates a machine for screen printing composed of a base 3 and a tilting wing 4, hinged to said base 3.

The base 3 is composed of a frame 3*a* formed by square tubes joined with 90.degree. two-way angular brackets, extruded or machined from solid and tightened with screws, and it is provided with a supporting surface 3*b* on the top of said 3*a* frame.

The aforementioned supporting plane 3*b* preferably comprises a paper material, and, still more preferably, a paper material with a content of silicone.

The wing 4 comprises, instead, a frame 6 formed by tubes with a squared cross-section, joined with 90.degree. two-way angular brackets, extruded or machined from solid, and tightened with screws.

Inside the frame 6 a fabric 7 is arranged stretched, in which an upper face 7*a* and a lower face 7*b* are defined, and on which an image has been previously formed, such as, for example, an image showing a wood grain pattern, by means of any known technique, so as to form an image matrix (i.e. a matrix).

The fabric 7 is fixed at the bottom of the frame 6 so that, when the wing 4 is arranged in the respective lowered position shown in FIGS. 2-5, wherein said frame 6 contacts the base 3, said fabric 7 is facing directly to the support surface 3*b* of the base 3.

On the wing 4 and on the base 3, adjusting knobs are provided—not shown in the enclosed figures—which allow, respectively, the adjustment of the position of said fabric 7 and of said supporting plane 3*b*, in order to achieve the respective necessary alignment for the following printing operations.

The screen printing method according to the present invention provides that, once the wing 4 has been prepared in the lowered position (see FIG. 2), an operator proceeds with the pouring of a screen printing ink on the upper face 7*a* of the tissue 7 (see FIG. 4), on which an image of a wood grain has been previously reproduced by bromograph impression.

Figure 3:
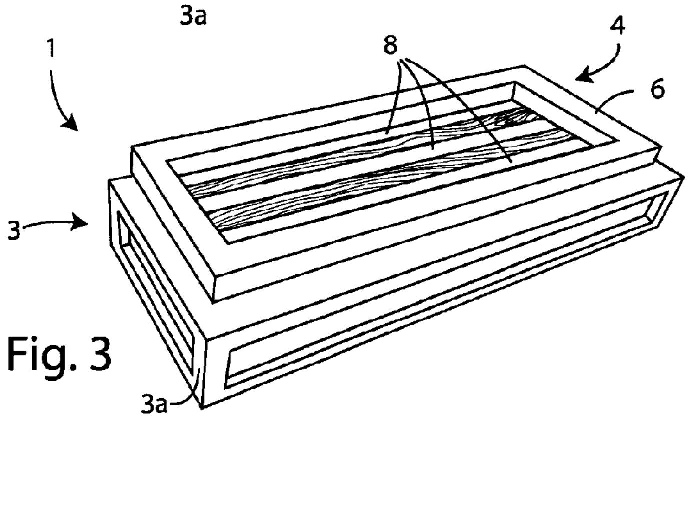
Figure 4:
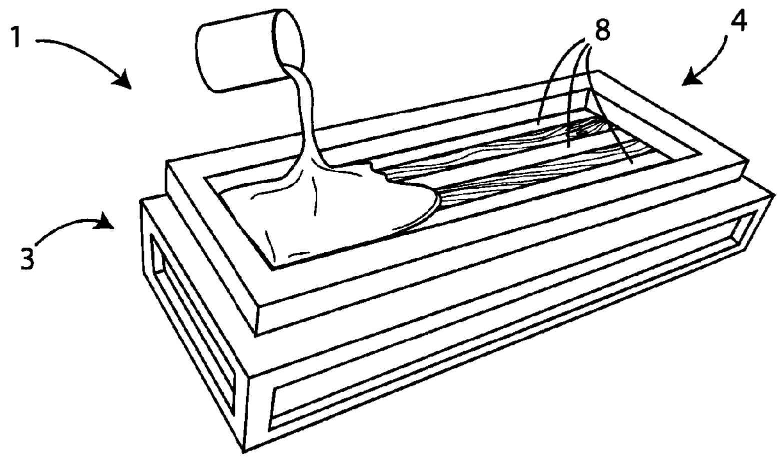

Before pouring the ink, it is possible to eventually apply, on certain areas of the upper face 7*a* of the fabric 7, a waterproof tape 8, to prevent the passage of ink in those areas (see FIG. 3).

Figure 5:
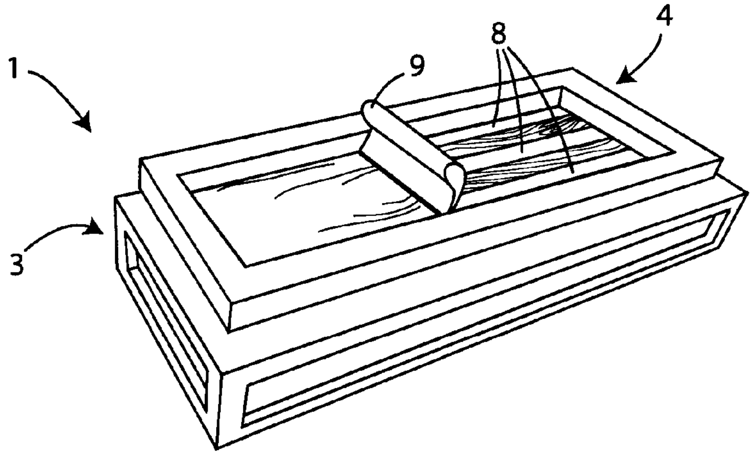

Once a predetermined amount of ink is poured on the fabric 7, it is spread over the entire upper face 7*a*, for example by a squeegee 9 (see FIG. 5).

Figure 6:
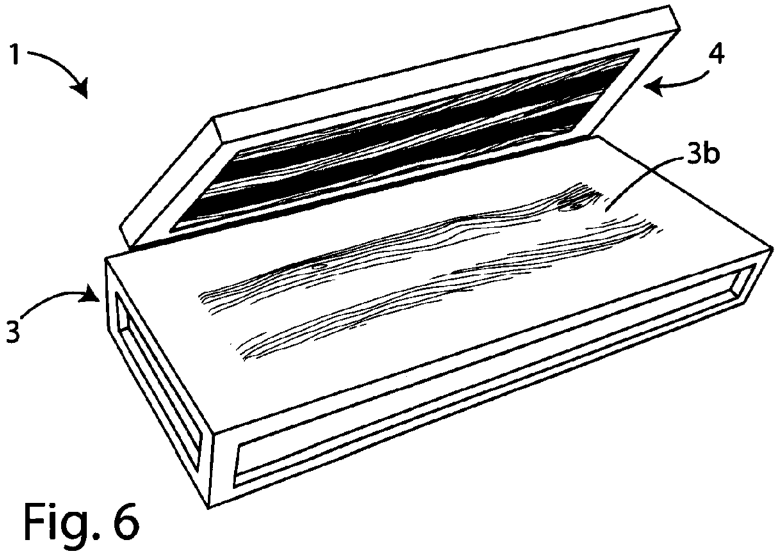

In this way, the ink passes through the fabric 7 only in the areas free from the above waterproof tape 8, depositing on the supporting surface 3*b* of the base 3 in the form of the same wooden grain pattern reproduced in the tissue 7 (see FIG. 6).

Figure 7:
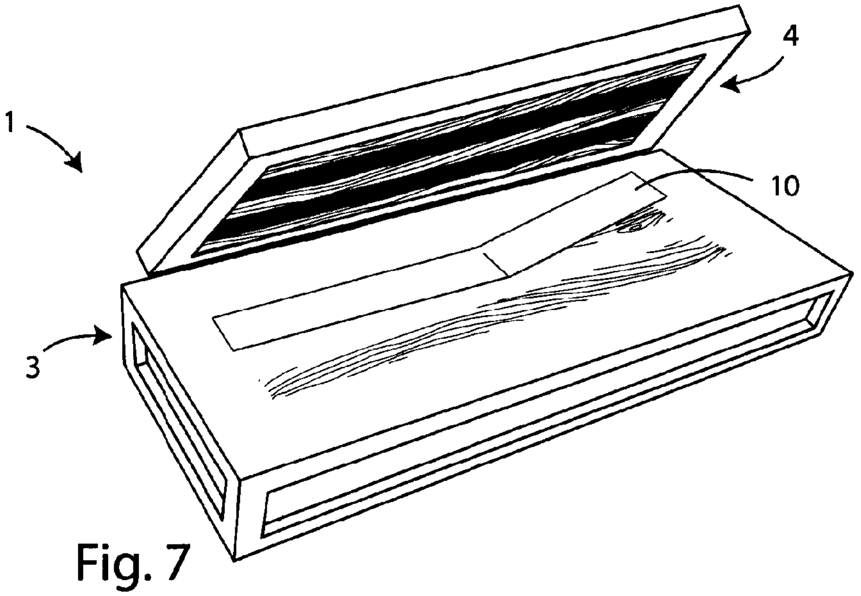

On areas of the support surface 3*b* where the ink is deposited, subsequently, a respective adhesive film 10 is applied, preferably but not limited to a paper tape, provided with an adhesive side 10*a*, making it adhere to the support surface 3 (see FIG. 7).

In this way, the ink will move from the supporting surface 3*b* of the screen printing machine 1 to the adhesive film 10.

Figure 8:
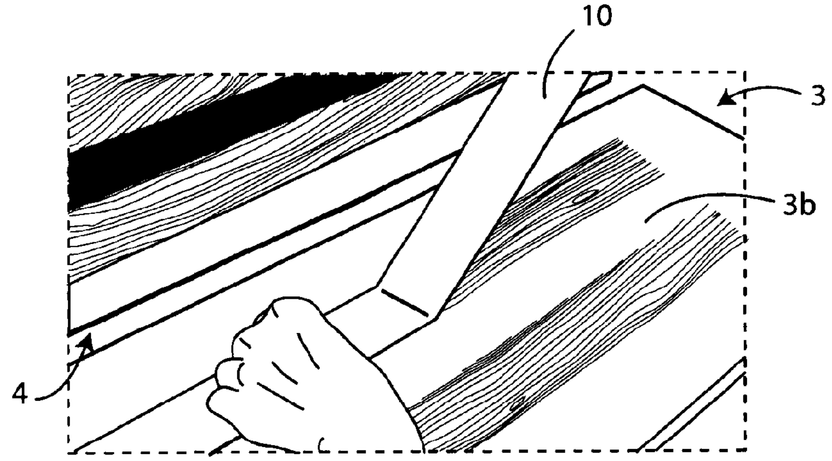

Once the adhesive film 10 adheres completely to the support surface 3*b*, the adhesive film 10 is taken manually, detaching it in correspondence of an edge thereof and lifting it up progressively towards the opposite edge (see FIG. 8).

Figure 9:
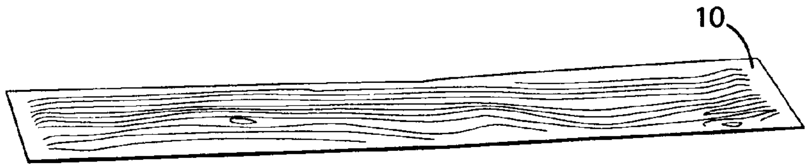

The adhesive film 10 taken in this way will have the wooden grain reproduced, by the ink, on the respective adhesive side 10*a* (see FIG. 9).

Figure 10:
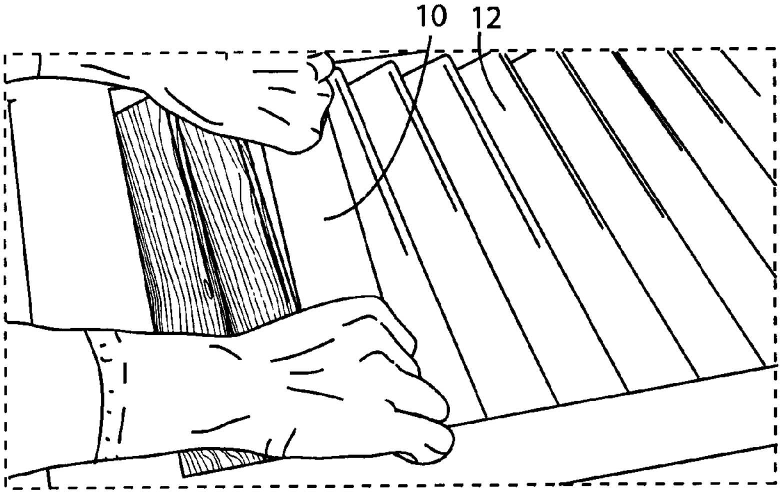
Figure 11:
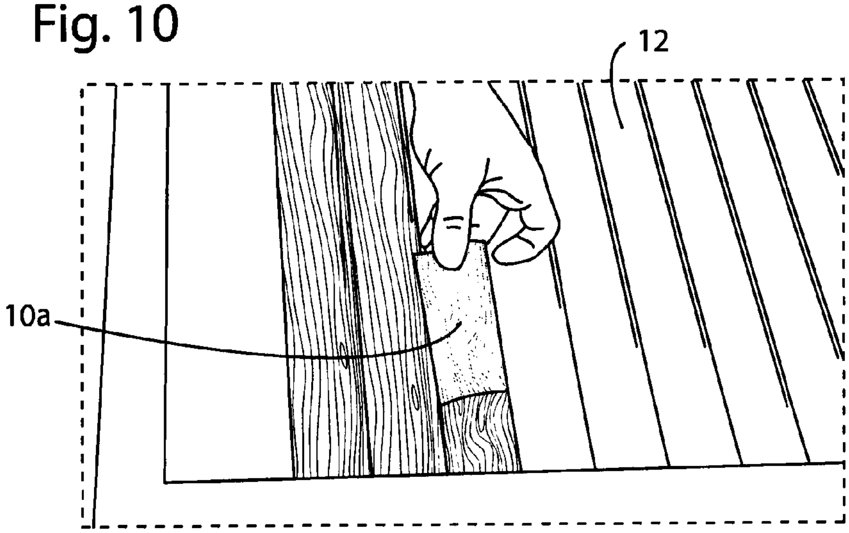
Figure 12:
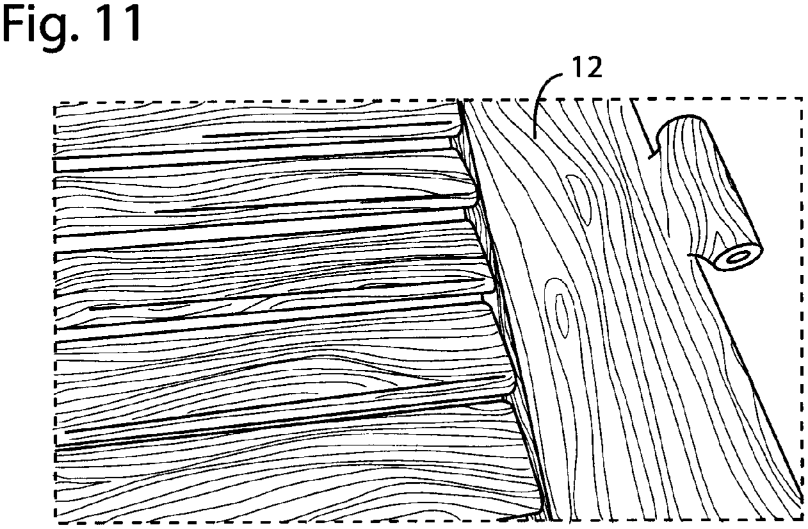
FIG. 12 shows a portion of the shutter on which the method of screen printing according to present invention is applied.

At this point, the method according to the present invention provides that the adhesive film 10 is applied on a support 12, such as a shutter (see FIG. 10) or any other support.

In this regard, it is noted that, according to the present method, the adhesive film 10 can be applied on a support having any shape, linear or variously shaped, and made from any material or combination of materials.

In particular, the application of the adhesive film 10 to the support 12 is performed by adhering the adhesive side 10*a* to a surface of said support 12 and lifting it, then, manually and progressively from a respective edge towards the opposite edge of the same.

In this way, the wooden grain pattern from the adhesive side 10*a* of the adhesive film 10 is transferred to the support 12 accurately and without alterations in shape.

The method will proceed by repeating the steps described above to obtain the desired coverage of the support 12, or the desired decoration of the same support 12.

Optionally, the method according to the present invention provides that, before the application of the adhesive film 10 to the support 12, the latter is treated by degreasing, to clean the surfaces to be decorated.

After the degreasing, if necessary, the application of a primer to the support chosen for the implementation of the method can follow and a subsequent painting.

It is noted, also, that all the operating steps of the method described above, object of the present invention, are carried out in room temperature and room pressure conditions.

As mentioned above, it is noted, finally, that due to the provision of an adhesive part in the film 10, it is possible to transfer, through the above described method, any image, drawing or representation from a source support to a target support absolutely reliably, without which that picture, drawing or representation is subjected to deformation in the transition from one support to another.

The adhesive part prevents, in fact, the ink deposited on it to expand, shrink or warp.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A screen printing method for creating an image on a target support, said method comprising the following steps:

providing a screen printing machine comprising a supporting structure, which is movable between a lower position and an upper position, a matrix mounted on said supporting structure, in which matrix an image is defined, and a supporting surface, said matrix being faced to said supporting surface when said supporting structure is arranged in said lower position;

placing said supporting structure in said lower position;

applying ink on at least a portion of said matrix to enable the ink to move from said matrix to said supporting surface, to reproduce said image on at least a portion of said supporting surface;

placing said supporting structure in said upper position;

providing a transferring support to transfer the ink reproducing said image from said supporting surface to said target support, said transferring support being provided with at least an adhesive portion with an adhesive thereon;

applying said at least one adhesive portion of said transferring support to a region of said supporting surface on which the ink is placed;

removing said transferring support from said supporting surface; and applying the adhesive portion of said transferring support, which carries the ink reproducing said image, to said target support, to allow the ink reproducing said image to move from said transferring support to said target support, wherein the screen printing method is carried out at room temperature.

2. The screen printing method according to claim 1, characterized in that wherein said matrix comprises a textile.

3. The screen printing method according to claim 1, wherein said transferring support is flexible.

4. The screen printing method according to claim 1, wherein said transferring support is a paper tape.

5. The screen printing method according to claim 1, wherein said supporting surface comprises a paper material.

6. The screen printing method according to claim 1, wherein said supporting surface comprises silicone.

7. The screen printing method according to claim 1, further comprising a step of degreasing said target support.

8. The screen printing method according to claim 1, further comprising a step of applying a primer to said target support.

9. The screen printing method according to claim 1, further comprising a step of painting said target support.

* * * * *